United States Patent [19]

Darrieux et al.

[11] Patent Number: 5,479,294

[45] Date of Patent: Dec. 26, 1995

[54] COLLIMATOR SUPPORT AND GUIDANCE DEVICE

[75] Inventors: Jean-Marc Darrieux, Bordeaux; Patrick Nicolo, Andernos, both of France

[73] Assignee: Sextant Avionique, Meudon La Foret, France

[21] Appl. No.: 160,914

[22] Filed: Dec. 3, 1993

[30] Foreign Application Priority Data

Dec. 24, 1992 [FR] France .................................. 92 15708

[51] Int. Cl.⁶ ................................................ G02B 27/14
[52] U.S. Cl. .......................... 359/630; 359/629; 359/632; 359/819; 244/1 R
[58] Field of Search ..................... 359/629, 630, 359/632, 811, 819, 827; 244/1 R, 118.5

[56] References Cited

U.S. PATENT DOCUMENTS

| | | | |
|---|---|---|---|
| 3,503,146 | 3/1970 | Woplin | 359/630 |
| 3,511,465 | 5/1970 | Morion | 359/630 |
| 3,614,314 | 10/1971 | Rossire | 359/629 |
| 3,620,601 | 11/1971 | Waghorn | 359/630 |
| 4,188,090 | 2/1980 | Ellis . | |
| 4,651,951 | 3/1987 | McFarlane | 244/1 R |
| 4,711,411 | 12/1987 | Copp | 244/1 R |
| 4,749,256 | 6/1988 | Bell et al. | 359/632 |
| 4,769,633 | 9/1988 | Ellis | 359/630 |
| 4,775,218 | 10/1988 | Wood et al. | 359/630 |
| 5,381,267 | 1/1995 | Woody | 359/630 |

FOREIGN PATENT DOCUMENTS

0279532 A1 8/1988 European Pat. Off. .

Primary Examiner—Georiga Y. Epps
Assistant Examiner—Michael A. Papalas
Attorney, Agent, or Firm—Oblon, Spivak, McClelland, Maier & Neustadt

[57] ABSTRACT

A device for supporting and guiding a collimator, particularly for a collimator designed to be installed on the ceiling of an aircraft. A collimator follows a complex predefined trajectory in a three-dimensional space (X, Y, Z) with up to six degrees of freedom, between a given operational position and a stored position. The device includes a first structure (3) attached to the aircraft having three guiding grooves, a first central groove (30) following a plane trajectory in a first plane (X, Y), and two lateral grooves (31, 32) on opposite sides of the central groove which follow second and third trajectories located in two planes perpendicular to the first plane. A second structure (4) rigidly attached to the collimator (1) moves along grooves by means of rollers (8a, 8b, 9a, 9b, 10), the number and shape of which enable the second structure to have six degrees of freedom along the complex trajectory.

7 Claims, 3 Drawing Sheets

COLLIMATOR SUPPORT AND GUIDANCE DEVICE

BACKGROUND OF THE INVENTION

This invention concerns a device for supporting and guiding a collimator, particularly for a collimator designed to be installed on the ceiling of an aircraft and that may need to be moved along a complex trajectory between an operational position and a stored position.

DESCRIPTION OF THE PRIOR ART

The collimator is an optoelectronic equipment that, when placed in front of the pilot's eyes, can superimpose synthetic images collimated to infinity, on the external landscape. These pictures must be accurately positioned relative to the aircraft references.

At the present time some collimators are fixed to the aircraft ceiling above the pilot's head. When the pilot wants to use it, he lowers a semi-reflecting mirror forming part of the collimator in front of his eyes; this mirror has the role of superimposing images on the landscape.

The disadvantage of this type of collimator is that they remain close to the pilot's head, even when in the non-operational position.

In order to correct this problem of being very close, some collimators have been put forward that are mobile in translation on a support fixed to the aircraft ceiling. In this type of collimator the pilot can maneuver the collimator either manually or with a motor drive by translation along its support either to its operational position or to its storage position.

These collimators have the disadvantage that they can only be adapted to one style of environment.

In different aircraft, dimensional constraints can prevent the installation of a mobile collimator between two points given by a simple translation.

SUMMARY OF THE INVENTION

An initial objective of the invention is to propose a device to support and guide the collimator along a complex trajectory, typically with six degrees of freedom, between its operational position and its stored position, this trajectory being predetermined as a function of the space available in the aircraft.

A second objective of the invention is to put forward a support and guidance device that is designed to be easily adaptable as a function of the predetermined trajectory imposed on it, that can vary from one aircraft to another.

More precisely, this invention concerns a support and guidance device for a collimator in an aircraft along a predetermined trajectory allowing the collimator to be moved using control means between an operational position and a stored position, wherein the device follows a predetermined trajectory in three-dimensional space (X, Y, Z). It comprises:

A first structure attached to the aircraft by first attachment means, and including a central guiding groove with two inside surfaces parallel to a first plane trajectory, and two lateral guiding grooves on opposite side of the central groove, each including two internal surfaces one parallel to a second and one parallel to a third trajectory, the second and third trajectories being located in two near parallel planes perpendicular to the first trajectory;

A second structure rigidly attached to the collimator by second attachment means, and mobile with respect to the first structure as a result of a central guiding device and first and second lateral guiding devices attached to the second structure and cooperating with the central groove and the lateral grooves in the first structure respectively, in order to support and guide the second structure and the collimator on each groove, the trajectories for each groove being such that their combination creates a movement of the second structure along the predetermined trajectory.

An advantage of the support and guiding device according to the invention as described below is that it allows easy disassembly of the collimator when it is defective, and may include means for providing good positioning repetitivity of the collimator in the operational position.

BRIEF DESCRIPTION OF THE DRAWINGS

The invention and its advantages will be better understood after reading the following description, with reference to the figures in the appendix.

DESCRIPTION OF A PREFERRED EMBODIMENT

Figure 1:
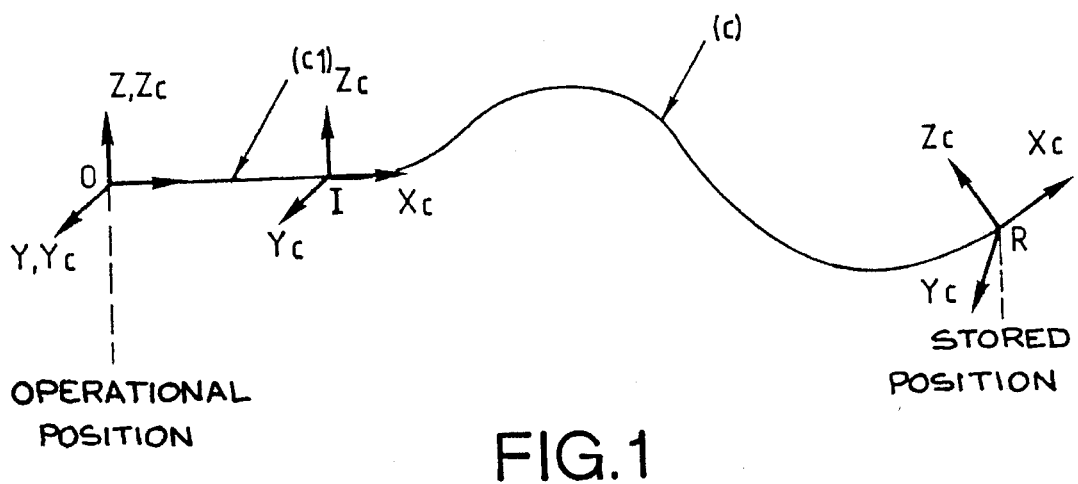
FIG. 1 shows an example of a complex trajectory to be followed by the collimator using the support and guidance device according to the invention.

FIG. 1 is an example of a complex trajectory to be followed by a collimator using the guidance and support system according to the invention.

The trajectory shown by curve (C) is said to be complex in the sense that it may correspond to a movement with six degrees of freedom, namely the three translations along the X, Y and Z axes and the three rotations around these same axes, in a three-dimensional space (in particular the space in a cockpit) with a coordinate system formed for example by three orthogonal axes X,Y,Z.

The collimator is represented by three different points O, I, R corresponding to three successive positions of this collimator along curve (C). An orthogonal coordinate system related to this collimator is also shown diagrammatically by the three orthogonal axes Xc, Yc, Zc, whose relative positions with respect to the X, Y, Z axes illustrate the movement with several degrees of freedom. Point O corresponds more precisely to the operational position of the collimator, for which the (Xc, Yc, Zc) coordinate system related to the collimator is coincident in this case with the (X, Y, Z) coordinate system. Point R shows the collimator storage position. Finally, point I represents an intermediate position of the collimator during its displacement along curve (C). We will see later that it is preferable that a length (C1) of the trajectory close to the operational position O is rectilinear, in this case along the X axis, in order to ensure good positioning of the collimator during use.

As we have already said, the complex trajectory (C) is predetermined as a function of the available space in the aircraft cockpit, that can obviously vary between different aircraft types.

Figure 2:
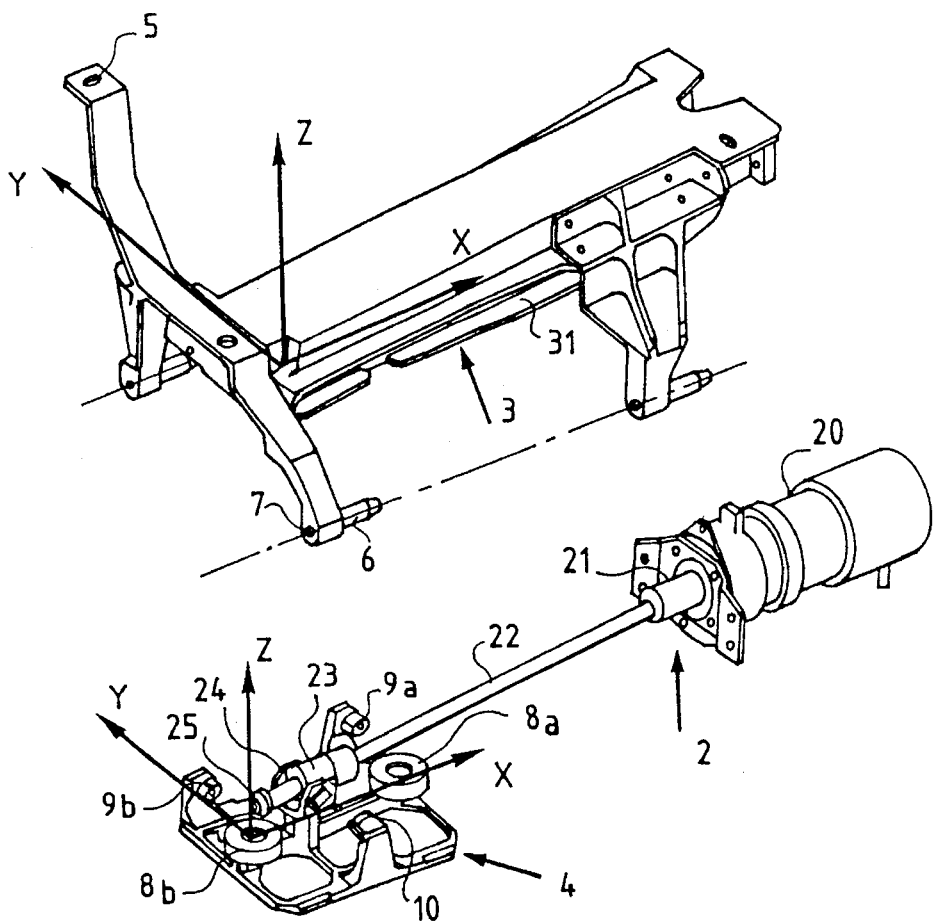
FIG. 2 is an exploded view of an example of construction of a collimator support and guidance device according to the invention.

FIG. 2 is an exploded view along the Z axis of an example of construction of the collimator support and guidance device according to the invention, allowing guidance along a predefined trajectory.

Figure 3A:
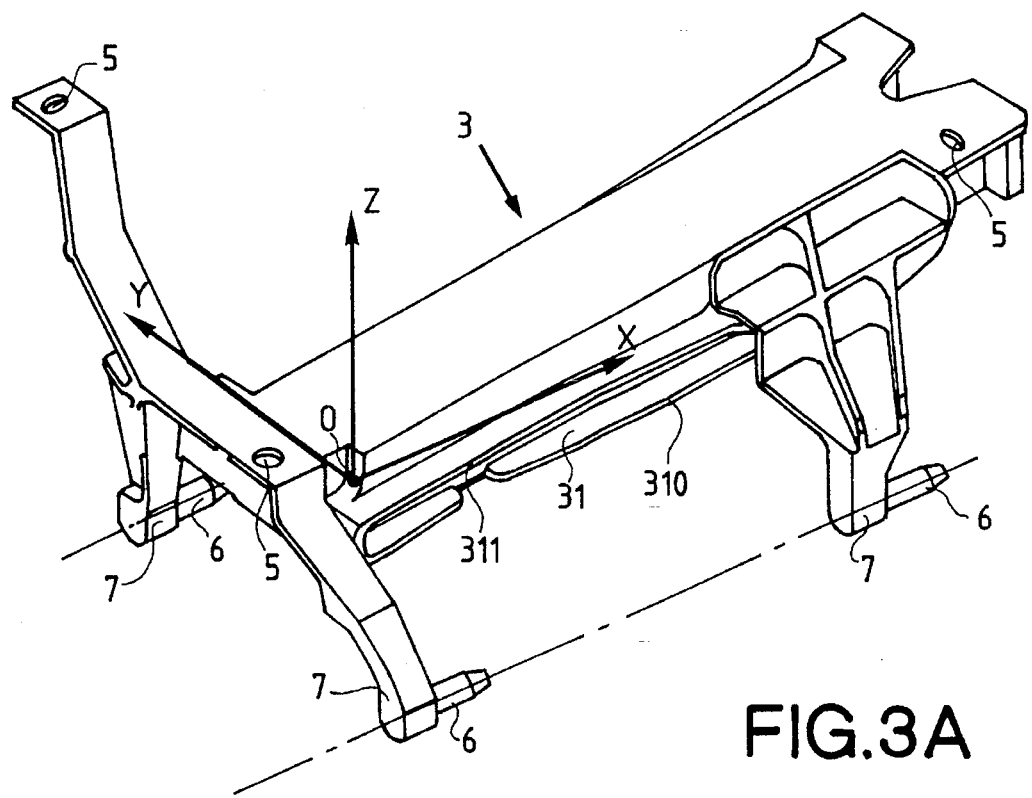
FIGS. 3A and 3B are perspective views of the top and bottom of the first fixed structure forming part of the guidance and support device in FIG. 2.
Figure 3B:
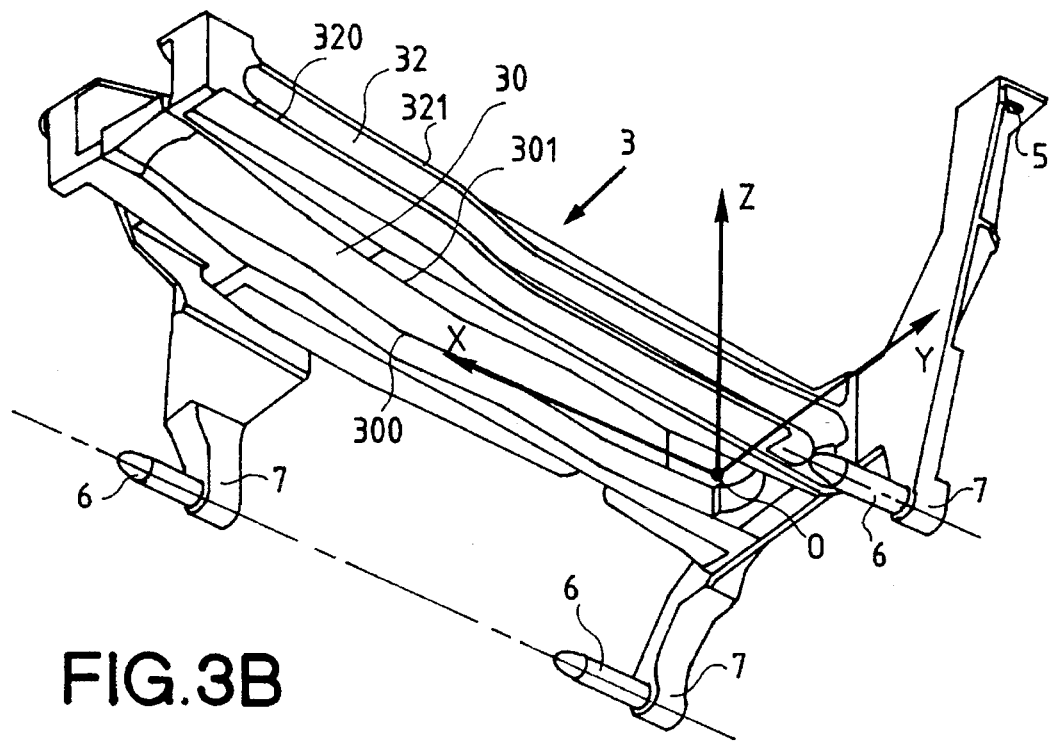

According to an essential characteristic of the invention, the support and guidance device comprises two main structures:

A first structure 3 fixed to the aircraft, and for which we will describe the component elements with reference to FIGS. 3A and 3B;

A second structure 4 rigidly attached to the collimator (not visible on FIG. 2) and mobile with respect to the first structure, along the predefined trajectory. Here again we will describe the component elements of this second structure later with reference to FIG. 4.

FIG. 2 also shows an example of control means 2 used to displace the second structure 4, and therefore the collimator, along the predefined trajectory. In this example the control is motor driven. Control means may for example consist of a motor reduction gear 20 driving a universal joint 21 in rotation about an axis that lies along the X axis in this case, and more generally lies along the main axis of the trajectory. This rotation imparts a translation movement along the X axis to ballscrew 22, fixed to universal joint 21 in rotation; a threaded nut 23 concentric with screw 22, attached to the second structure 4 so as to be free in rotation and fixed in translation by any known attachment means 24, is driven by nut 25 that may for example close the free end of screw 22, to follow the translation of screw 22 along the X axis. Obviously manual control means may also be provided, for example in the form of a handle rigidly attached to the second structure 4 and directly pulled by the aircraft pilot.

The component elements of the first structure 3 will now be described with reference to FIGS. 3A and 3B, that represent views of the top and bottom respectively of this first structure 3 in the X, Y, Z orthogonal coordinate system.

This first structure is attached to the aircraft through first attachment means 5, for example at three points represented by holes on FIGS. 3A and 3B. These first attachment means are made using any known methods of making a rigid attachment, such that the weight of the complete device and of the collimator are supported.

According to an essential characteristic of the invention, this first structure 3 comprises three guiding grooves, the trajectories of which are such that their combination forms the predefined complex trajectory:

More precisely, on its lower part, the first structure includes a central guiding groove 30 with two inside surfaces 300 and 301 parallel to a first trajectory. This first trajectory is plane, and in this case lies in the plane of the X, Y axes.

The first structure 3 also includes two identical lateral guiding grooves 31, 32, placed on each side of the central groove 30, each containing two inside surfaces referenced 310, 311 and 320, 321 respectively. The two surfaces 310 and 311 of groove 31 are parallel to a second plane trajectory contained in the plane of the X, Y axes and surfaces 320, 321 of groove 32 are parallel to a third trajectory also contained in the plane of the X, Z axes.

An important characteristic of the invention is therefore to have a complex initial trajectory broken down into two perpendicular planes and three simpler plane trajectories, making it possible to manufacture and machine grooves.

The first structure 32 of the device according to the invention also beneficially contains three identical pins 6 placed at three different locations on the first structure 3 parallel to the main trajectory axes, in other words the X axis in our case, and fixed to limit stops 7 of structure 3 preferably perpendicular to this main axis. Two of the three limit stops 7 are preferably located in the same plane, in this case the plane containing the Z, Y axes and point O in FIG. 1. The number and relative position of these pins 6 are necessary and sufficient to give good positioning repetitivity of the collimator in the operational position. When being put into its operational position, the collimator, not shown on FIGS. 3A and 3B, engages on to the three pins 6 for example by means of three holes, and actually reaches its operational position O when it reaches the limit stop 7. In order to synchronize the collimator engaging on the three pins 6, a rectilinear trajectory is necessary over at least the length of the pins, which explains the rectilinear position (C1) shown on FIG. 1.

Figure 4:
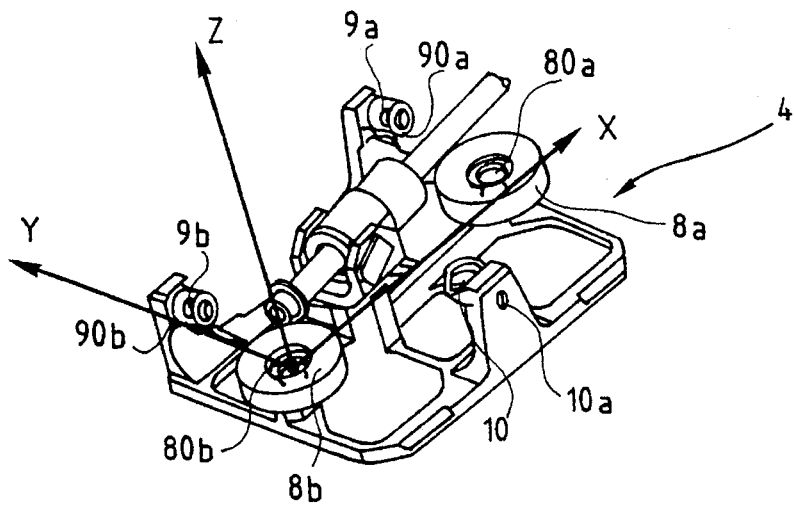
FIG. 4 is a perspective top view of the second mobile structure forming part of the guidance and support device in FIG. 2.

FIG. 4 is a top view of the second mobile structure 4 forming part of the guidance and support device shown in FIG. 2. This figure also shows part of the motor driven control means that we will not describe again. For simplification purposes, we will only describe elements of this second structure that cooperate with grooves 30, 31, 32 on the first structure 3 to cause displacement along the complex trajectory (C):

The second structure 4 is fitted with three guidance devices each cooperating with one of the three grooves 30, 31, 32. More precisely, a first central guidance device consisting of two rollers 8a, 8b with distinct and parallel rolling axes 80a, 80b, cooperate with the central guiding groove 30. In our case, the rollers 8a, 8b are in a plane containing the X and Y axes and have rolling axes 80a, 80b parallel to the Z axis. The rollers have a diameter equal to the width of the groove 30, and each comes into tangential contact with each of the inside surfaces 300 and 301 of the central groove 30. Similarly a first lateral guiding device composed of two rollers 9a, 9b, with distinct and parallel rolling axes 90a, 90b, cooperates with one of the lateral guiding grooves, groove 32 in our case. In order to prevent the rollers from getting blocked in the grooves, the side roller rolling axes 90a, 90b each intersect with the central roller rolling axes 80a, 80b. This means that rollers 80a, 80b and rollers 90a, 90b have the same spacing between them. As before, each roller 9a, 9b comes into tangential contact with each inside surface 320, 321 of the side groove 32.

Finally a second lateral guiding device consisting of a single roller 10 cooperates with the remaining lateral groove, in other words groove 31 in our example. The rolling axis 10a of this roller 10 is parallel to rolling axes 80a, 80b, and is preferably at the same distance from these two rolling axes.

The combination of the five rollers and the above three grooves can impart a movement with six degrees of freedom:

The first trajectory followed by the central guiding device generates translations along the X and Y axes. Moreover the relative position of the two rollers 80a, 80b can generate a rotation about the Z axis. Similarly the second and third trajectories followed by the first and second lateral devices can obtain translation along the Z axis, and the relative position of the two rollers 9a, 9b can generate a rotation about the Y axis. Finally, rotation about the X axis is generated by the relative position between rollers 9a, 9b, and roller 10.

For a complex trajectory with low movement amplitudes along the three axes, the bottom of the grooves may be plane. Simply make sure that the grooves are deep enough so that rollers can move in translation along their rolling axis without leaving the grooves or touching the bottom of these grooves.

On the other hand for complex trajectories with large movement amplitudes, it is useful to optimize the total volume of the device, for example by having the bottoms of the grooves follow a trajectory nearly the same as the complex trajectory.

It is also worth optimizing the shape of rollers in order to prevent these rollers from getting blocked in the grooves: it is useful to use spherical shaped rollers for parts in contact with the inside surfaces of grooves in order to give a constant diameter between tangential contact points, regardless of the position of the roller in the groove.

Figure 5:
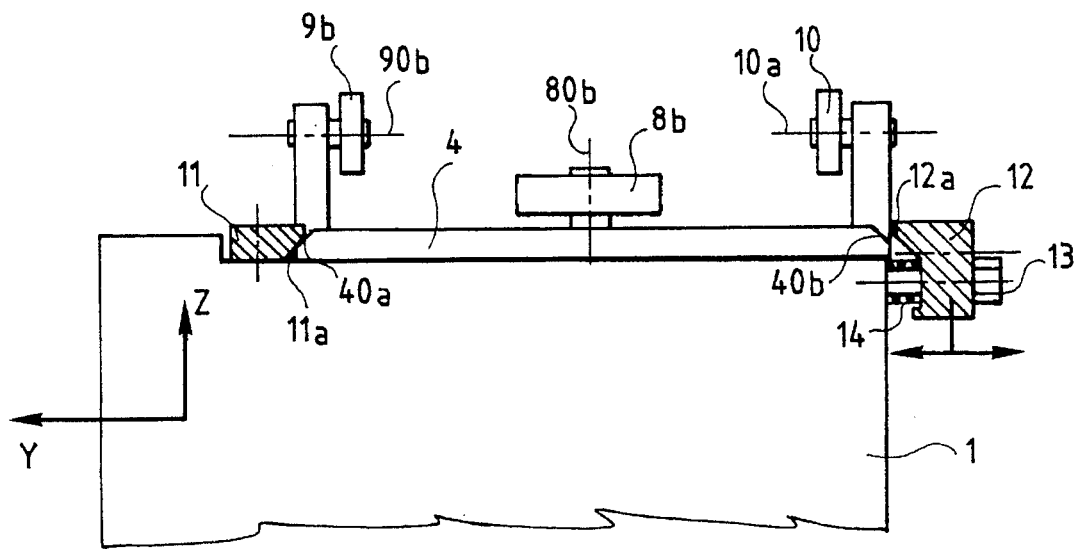
FIG. 5 is a view in the ZY plane illustrating an example of the construction of means for attachment of the collimator to the mobile structure of the device according to the invention.

FIG. 5 shows a view in the ZY plane of part of the support and guiding device according to the invention, illustrating an example of construction of the second means of attachment of collimator 1 to the mobile structure 4 of the device.

These second attachment means beneficially form a fast attachment simplifying assembly and disassembly of collimator 1. For example these second attachment means are composed of two flanges 11 and 12 with the same axis almost parallel to the rolling axis 90b (or 10a) of the lateral rollers of the mobile structure 4.

One of the flanges 11 is fitted to collimator 1, whereas the other flange 12 is rigidly attached in translation to a threaded screw 13 mounted on the collimator. An axial spring 14 on screw 13 holds flange 12 against the head of screw 13. When screw 13 is tight, the collimator 1 is held onto structure 4 by o means of the inclined surfaces 11a, 12a of each flange 11, 12 in contact with the surfaces of the same inclination 40a, 40b located on the mobile structure 4.

The device according to the invention as presented above has the important advantage that it can easily be adapted as a function of the aircraft in which it is mounted. It is simply necessary to determine the two positions, operational and storage, and the complex trajectory (C) between these two positions, in the actual environment. This complex trajectory (C) is used to define the plane trajectories of the central and lateral grooves, so that the machining to be done on the first structure can be defined. The method used to define these trajectories may consist of considering successive positions of the collimator in turn, and therefore of the various rollers along the complex trajectory, and then smoothing the curves connecting these successive positions. Therefore it will only be necessary to modify the first structure for use on different aircraft.

We claim:

1. A device for support and guidance of a collimator in an aircraft along a predetermined trajectory allowing the collimator to be moved using control means between an operational position and a stored position, wherein the device follows a predetermined trajectory in a three dimensional space (X, Y, Z), and comprises:

a first structure attached to the aircraft by first attachment means, and including a central guiding groove with two inside surfaces parallel to a first plane trajectory, and two lateral guiding grooves on opposite sides of the central groove, each including two internal surfaces one parallel to a second and one parallel to a third trajectory, the second and third trajectories being located in two near parallel planes perpendicular to the first trajectory;

a second structure rigidly attached to the collimator by second attachment means, and mobile with respect to the first structure as a result of a central guiding device and first and second lateral guiding devices attached to the second structure and cooperating with the central groove and the lateral grooves in the first structure respectively, in order to support and guide the second structure and the collimator on each groove, the trajectories for each groove being such that their combination creates a movement of the second structure along the predetermined trajectory.

2. A support and guiding device according to claim 1, wherein the central guiding device is composed of two rollers with distinct and parallel rolling axes, each roller coming into tangential contact with each of the inside surfaces of the central groove; and in that the first lateral guiding device consists of two rollers with distinct and parallel rolling axes, each rolling axis crossing one of the rolling axes of the central guiding device, and each roller on this first lateral device coming into tangential contact with each inside surface of one of the two lateral guiding grooves, and in that the second lateral guiding device is composed of a roller with rolling axis located between and parallel to the two rolling axes for the first device, this roller coming into tangential contact with each of the surfaces of the other lateral groove.

3. A support and guiding device according to claim 2, wherein the central groove and lateral grooves must be sufficiently deep so that the various rollers can move in translation along their rolling axes without leaving the grooves, or touching the bottom of these grooves.

4. A support and guiding device according to any one of claims 2 and 3, wherein the parts of rollers that are in tangential contact with the internal surfaces of the grooves, are spherical shaped.

5. A support and guiding device according to claim 1 above, wherein a portion ($C_1$) of the predetermined trajectory is rectilinear in the vicinity of the collimator operational position.

6. A support and guiding device according to claim 5 wherein the first structure has three pins at three different positions, two of which are located in a plane containing the operational position of the collimator and perpendicular to the C1 portion of the trajectory, three pins being parallel to this portion and engaging in three holes in the collimator.

7. A support and guiding device according to claim 1, wherein the control means consist of a motor reduction gear driving in rotation a universal joint and a ballscrew fixed in rotation to the universal joint and given a translation movement, and a nut concentric with the ballscrew, attached to the second structure to be free in rotation and fixed in translation, the said nut being driven in a translation movement by a nut closing a free end of the ballscrew.

* * * * *